(12) United States Patent
Ryu et al.

(10) Patent No.: US 6,479,426 B2
(45) Date of Patent: Nov. 12, 2002

(54) NEGATIVE ACTIVE MATERIAL FOR LITHIUM SECONDARY BATTERY

(75) Inventors: Jae-Yul Ryu, Cheonan (KR); Sang-Young Yoon, Cheonan (KR); Wan-Uk Choi, Cheonan (KR); Kyou-Yoon Sheem, Cheonan (KR); Sang-Jin Kim, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/851,761

(22) Filed: May 9, 2001

(65) Prior Publication Data

US 2001/0053743 A1 Dec. 20, 2001

(30) Foreign Application Priority Data

May 17, 2000 (KR) .............................................. 00-26266

(51) Int. Cl.[7] .......................... B01J 21/18; B01J 23/02; H01M 4/58; H01B 1/54; C09K 3/00
(52) U.S. Cl. ...................... 502/182; 502/183; 502/185; 429/218.1; 429/231.95; 429/231.5; 429/231.6; 429/231.7; 429/231.8; 252/502; 252/700
(58) Field of Search .................. 429/218.1, 231.95, 429/231.5–231.8; 252/502, 700; 502/182, 183, 185

(56) References Cited

U.S. PATENT DOCUMENTS

| | | | | |
|---|---|---|---|---|
| 6,156,457 A | * | 12/2000 | Takami et al. | 429/231.4 |
| 6,194,067 B1 | * | 2/2001 | Hamada et al. | 428/367 |
| 6,355,377 B1 | * | 3/2002 | Sheem et al. | 429/231.8 |

* cited by examiner

*Primary Examiner*—Mark L. Bell
*Assistant Examiner*—Patricia L. Hailey
(74) *Attorney, Agent, or Firm*—Christie, Parker & Hale, LLP

(57) ABSTRACT

Disclosed is a negative active material for a lithium secondary battery. The negative active material includes graphitized coke having a graphitization catalyst element and non-flat artificial graphite. The negative active material for a lithium secondary battery has good electrolyte-immersibility due to the gap between the graphite particles from graphitized coke having a graphitization catalyst element, and non-flat artificial graphite. Therefore, the present invention may provide a lithium secondary battery which has good high-rate capacity and initial efficiency.

5 Claims, 1 Drawing Sheet

NEGATIVE ACTIVE MATERIAL FOR LITHIUM SECONDARY BATTERY

CROSS REFERENCE TO RELATED APPLICATION

This application is based on application No. 2000-26266 filed in the Korean Industrial Property Office on May 17, 2000, the content of which is incorporated hereinto by reference.

BACKGROUND OF THE INVENTION (a) Field of the Invention

The present invention relates to a negative active material for a lithium secondary battery, and more particularly, to a negative active material for a lithium secondary battery, into which electrolyte is easily immersed.

(b) Description of the Related Art

Generally, carbonaceous material is used as a negative active material for a lithium secondary battery. Carbonaceous materials are classified into amorphous carbon and crystalline graphite, and crystalline graphite includes artificial graphite and natural graphite.

Natural graphite, or platelet-type graphite produced by graphitization then pulverization of coke, are candidates for positive active material in lithium secondary batteries as they are inexpensive and exhibit voltage flatness, high capacity and efficiency. But a low density and a high surface area of natural graphite and platelet type artificial graphite having plate-shaped or flake type particle structures requires a large amount of solvent during the preparation of active material slurry so that adhesion between slurry and a current collector is reduced and thus the cycle life characteristics deteriorates. The slurry including a large amount of solvent has poor fluidity so that a step of coating the slurry on the current collector is extremely slowly performed to obtain uniform thickness slurry coating layer on the current collector.

In addition, the plates of the natural graphite or platelet type artificial graphite active material lie parallel on a current collector as shown in FIG. 1 during the electrode preparation. In FIG. 1, A refers to the basal plane, B refers to the edge, 1 refers to the collector, and 2 refers to the plate shaped graphite. This result allows the graphite to be severely compressed to the collector, which results in the poor electrolyte-immersibility to the graphite active material and the decreased high-rate cycle life characteristics. Namely, the basal planes of graphite A are severely compressed to the collector 1 so that lithium ions have difficultly intercalating into the graphite, thereby decreasing capacity. Due to such a severe compression, the adhesion between graphite and the collector is reduced and thus the cycle life characteristics deteriorate.

Such a severe compression is detrimental in a lithium polymer battery. Generally, positive active material slurry includes plasticizer used for making perforations in the electrode. That is, the plasticizer is extracted by using an organic solvent and forms a plurality of micro-spaces in the electrode. These micro-spaces increase the contact area between the active material and the electrolyte. However, the severe compression renders it is difficult for extraction solvents, such as ether or methanol, to reach the plasticizer so that the plasticizer can be completely extracted from the electrode, thus the electrochemical characteristics deteriorate.

SUMMARY OF THE INVENTION

It is an object of the present invention to provide a negative active material for a lithium secondary battery which exhibits good high-rate charge and discharge efficiency.

It is another object to provide the negative active material for a lithium secondary battery into which electrolyte is easily immersed.

In order to achieve these objects and others, the present invention provides a negative active material for a lithium secondary battery including graphitized coke, and non-flat artificial graphite. The graphitized coke includes a graphitization catalyst.

BRIEF DESCRIPTION OF THE DRAWINGS

A more complete appreciation of the invention, and many of the attendant advantages thereof, will be readily apparent as the same becomes better understood by reference to the following detailed description, when considered in conjunction with the accompanying drawings, wherein.

DETAILED DESCRIPTION OF THE INVENTION

A negative active material for a lithium secondary battery of the present invention includes graphitized coke and non-flat artificial graphite. The graphitized coke is a platelet-type artificial graphite graphitized by adding a graphitization catalyst to the coke. Hereinafter, platelet-type graphite made from coke refers to graphitized coke and non-flat artificial graphite refers to artificial graphite.

Figure 1:
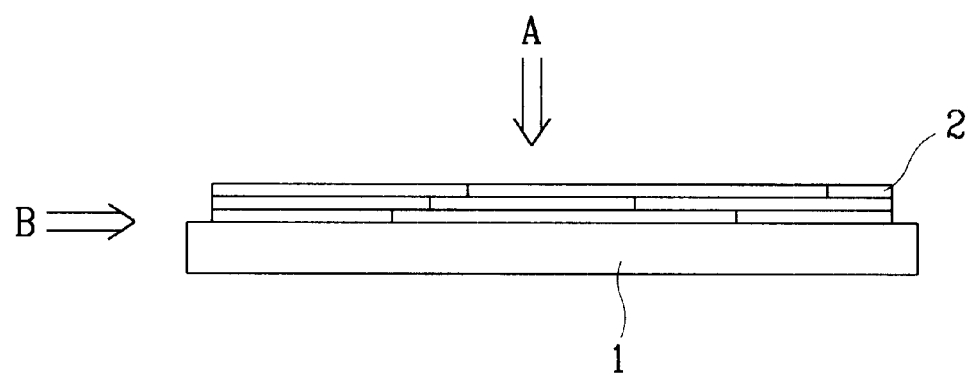
FIG. 1 is a side cross sectional view showing an electrode using a conventional natural graphite active material.
Figure 2:
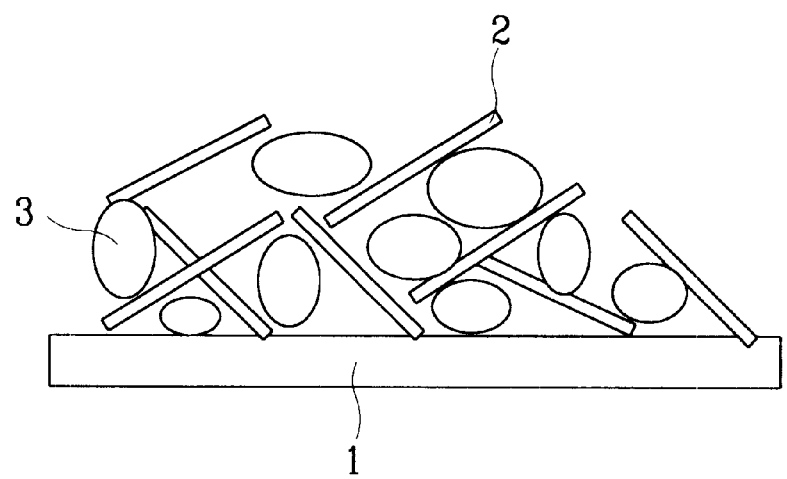
FIG. 2 is a side cross sectional view showing an electrode using with a negative active material according to an example of the present invention.

The negative active material of the present invention, as shown in FIG. 2, is prepared by mixing graphitized coke 2 with artificial graphite 3 having a spherical shape rather than a platelet-type shape. The negative active material of the present invention has good electrolyte-immersibility and an electrolyte is easily immersed into the negative active material owing to the gap between the graphite particles on the current collector 1. The gap also helps to increase the adhesion between the active material and the collector because the gap can hold a binder. Accordingly, high-rate charge and recharge characteristics are improved and cycle life characteristics are also improved.

The graphitized coke preparation will be illustrated in more detail.

Coke is mixed with at least one graphitization catalyst element or a compound thereof. The graphitization catalyst element or the compound thereof (hereinafter, the graphitization catalyst element or the compound thereof refers to an additional material) may be solid or solution. A solvent in the additional material solution may be water, organic solvent, or a mixture thereof. The organic solvent may be ethanol, isopropyl alcohol, toluene, benzene, hexane, or tetrahydrofuran. The additional material solution preferably has a sufficient concentration to enable uniform mixing. If the concentration is excessively low, it is difficult to dry the solvent and to mix uniformly. On the other hand, if the concentration is too high, the additional material is agglomerated and it is unable to react with carbon.

The mixing step with the addition material solution may be performed by using a mechanical apparatus to mix the additional material solution with coke, or by spray-drying, spray-pyrolyzing, or freeze-drying the solution to the carbon.

The catalyst element may be one or more of a transition metal; an alkali metal; an alkali earth metal; a semi-metal of Group 3A, Group 3B, Group 4A, and Group 4B; an element of Group 5A and 5B; or a mixture thereof. Preferred are transition metals such as Mn, Ni, Fe, Cr, Co, Cu, or Mo; alkali metals such as Na or K; alkali earth metals such as Ca or Mg; semi-metals of Group 3A such as Sc, Y, La or Ac; semi-metals of Group 3B such as B, Al or Ga; semi-metals of Group 4A such as Ti, Zr or Hf; semi-metals of Group 4B such as Si, Ge or Sn; elements of Group 5A such as V, Nb or Ta; and elements of Group 5B such as P, Sb, or Bi. Any compound may be used as the catalyst element compound if the effect of the graphitization catalyst is induced. The exemplary thereof include oxides, nitrides, carbides, sulfides, and hydroxides of the element.

In the mixing step, the weight ratio of the coke to the graphitization catalyst element is preferably 0.99 to 0.80:0.01 to 0.20. If the graphitization catalyst element compound is used, the weight ratio of the coke to the graphitization catalyst element in the compound is the same.

The resulting mixture is sintered at a temperature of 500 to 800° C. The sintered mixture is ground and graphitized at a temperature of 2000 to 3000° C., thereby obtaining platelet-type graphitized coke particles. The grinding step may follow the graphitization step.

Thereafter, the negative active materials for a lithium secondary battery are prepared by mixing the platelet-type graphitized coke and non-flat artificial graphite. The weight ratio of the graphitized coke and artificial graphite is preferably 70 to 90:30 to 10.

If the amount of the artificial graphite is less than 10 wt %, the effect of mixing non-flat artificial graphite is trivial because the gap between the graphite particles is not fully developed. But it is not preferable to use more than 30 wt % of the artificial graphite because the capacity is lowered.

The artificial graphite may be any non-flat artificial graphite. The exemplary shape of the artificial graphite may be fibrillar, spherical, or block-type.

The negative active material of the present invention is mixed with a binder such as polyvinylidene fluoride in an organic solvent such as N-methyl pyrrolidone to prepare a negative active material slurry composition. Thereafter, the negative active material slurry composition is coated on a Cu-foil collector and dried to produce a negative electrode.

Using the negative electrode, a lithium secondary battery may be manufactured by the conventional process known in the related arts. At this time, for a positive active material, a transition metal compound may be used, and for an electrolyte, a lithium salt dissolved in organic solvent is used. The organic solvent may be ethylene carbonate or propylene carbonate, and the lithium salt may be $LiPF_6$, $LiAsF_6$, $LiCF_3SO_3$, $LiN(CF_3SO_2)_3$, $LiBF_6$ or $LiClO_4$.

The present invention is further explained in more detail with reference to the following examples

EXAMPLE 1

Coke, $B_2O_3$ and $TiO_2$ were mixed in the weight ratio of 100:6.83:0.86. The resulting mixture was sintered and ground at a temperature of 700° C., and then graphitized at a temperature of 2650° C. to prepare platelet-type graphitized coke particles.

90 wt % of the platelet-type shaped graphitized coke and 10 wt % of spherical artificial graphite were mixed to prepare a negative active material for a lithium secondary battery.

EXAMPLE 2

A negative active material for a lithium secondary battery was prepared by the same procedure as in Example 1 except that fibrillar artificial graphite instead of spherical artificial graphite was used.

EXAMPLE 3

A negative active material for a lithium secondary battery was prepared by the same procedure as in Example 1 except that a block-type artificial graphite instead of spherical artificial graphite was used.

COMPARATIVE EXAMPLE 1

A negative active material for a lithium secondary battery was prepared by the same procedure as in Example 1 except that only the plate shaped graphitized coke prepared in Example 1 was used.

Control 1

Platelet-type graphitized coke was prepared by graphitizing at a temperature of 2650° C. and grinding the coke.

80 wt % of the prepared plate shaped graphitized coke and 20 wt % of spherical artificial graphite were mixed to prepare a negative active material for a lithium secondary battery.

Control 2

A negative active material for a lithium secondary battery was prepared by the same procedure as in Control 1 except that fibrillar artificial graphite instead of spherical artificial graphite was used.

Control 3

A negative active material for a lithium secondary battery was prepared by the same procedure as in Control 1 except that block-type artificial graphite instead of spherical artificial graphite was used.

COMPARATIVE EXAMPLE 2

A negative active material for a lithium secondary battery was prepared by the same procedure in Control 1 except that only the plate shaped graphitized coke prepared in Control 1 was used.

Lithium secondary cells were manufactured using the negative active materials according to Examples 1 to 3, Controls 1 to 3, and Comparative Examples 1 and 2.

The reversible capacity (mAh/g), initial efficiency (%), and high-rate capacity (mAh/g) of the cells were measured and the results are presented in Table 1.

TABLE 1

|  | Reversible capacity (mAh/g) | Initial efficiency (%) | High-rate capacity (mAh/g) |
| --- | --- | --- | --- |
| Example 1 | 335 | 92.4 | 320 |
| Example 2 | 330 | 92.6 | 315 |
| Example 3 | 335 | 92.5 | 320 |
| Control 1 | 305 | 90.6 | 280 |
| Control 2 | 300 | 91.0 | 275 |
| Control 3 | 305 | 90.7 | 280 |

TABLE 1-continued

|  | Reversible capacity (mAh/g) | Initial efficiency (%) | High-rate capacity (mAh/g) |
|---|---|---|---|
| Comparative Example 1 | 345 | 92.1 | 310 |
| Comparative Example 2 | 310 | 89.4 | 250 |

As shown in Table 1, the cells according to Examples 1 to 3 using spherical, fibrillar or block-type graphite and the graphitization catalyst exhibited s slightly lower reversible capacity, but good high-rate capacity and initial efficiency when compared with Comparative Example 1.

The cells using platelet and spherical-type graphite according to Controls 1 to 3 exhibited poor reversible capacity, high-rate capacity, and initial efficiency when compared with Examples 1 to 3.

In addition, the cells manufactured by using only platelet-type shaped graphitized coke without adding the graphitization catalyst element according to Comparative Example 2 exhibited poor reversible capacity, high-rate capacity, and initial efficiency when compared with Examples 1 to 3.

As described above, the negative active material for the lithium secondary battery of the present invention including graphitized coke and non-flat artificial graphite, has good electrolyte-immersibility due to the gap between the graphite particles. Therefore, the present invention may provide lithium secondary batteries having good high-rate capacity and initial efficiency.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a lithium secondary battery comprising:

graphitized coke including a graphitization catalyst element; and non-flat artificial graphite.

2. The negative active material of claim 1 wherein the weight of the artificial graphite is 10 to 30 wt % of total active material.

3. The negative active material of claim 1 wherein the non-flat artificial graphite is selected from the group consisting of fibrillar, spherical, and block-type shapes.

4. The negative active material of claim 1 wherein the graphitization catalyst element is at least one material selected from the group consisting of one or more of a transition metal; an alkali metal; an alkali earth metal; a semi-metal of Group 3A, Group 3B, Group 4A, and Group 4B; and an element of Group 5A and 5B.

5. The negative active material of claim 4 wherein the transition metal is selected from the group consisting of Mn, Ni, Fe, Cr, Co, Cu, Mo and mixtures thereof; the alkali metal is selected from the group consisting of Li, Na, K and mixtures thereof; the alkali earth metal is selected from the group consisting of Be, Sr, Ba, Ca, Mg and mixtures thereof; the semi-metal of Group 3A is selected from the group consisting of Sc, Y, La, Ac and mixtures thereof; the semi-metal of Group 3B is selected from the group consisting of B, Al, Ga and mixtures thereof; the semi-metal of Group 4A is selected from the group consisting of Ti, Zr, Hf and mixtures thereof; the semi-metal of Group 4B is selected from the group consisting of Si, Ge, Sn and mixtures thereof; the element of Group 5A is selected from the group consisting of V, Nb, Ta and mixtures thereof; and the element of Group 5B is selected from the group consisting of P, Sb, Bi and mixtures thereof.

* * * * *